(No Model.)
H. ZOLLINGER.
RASP.
No. 562,691. Patented June 23, 1896.
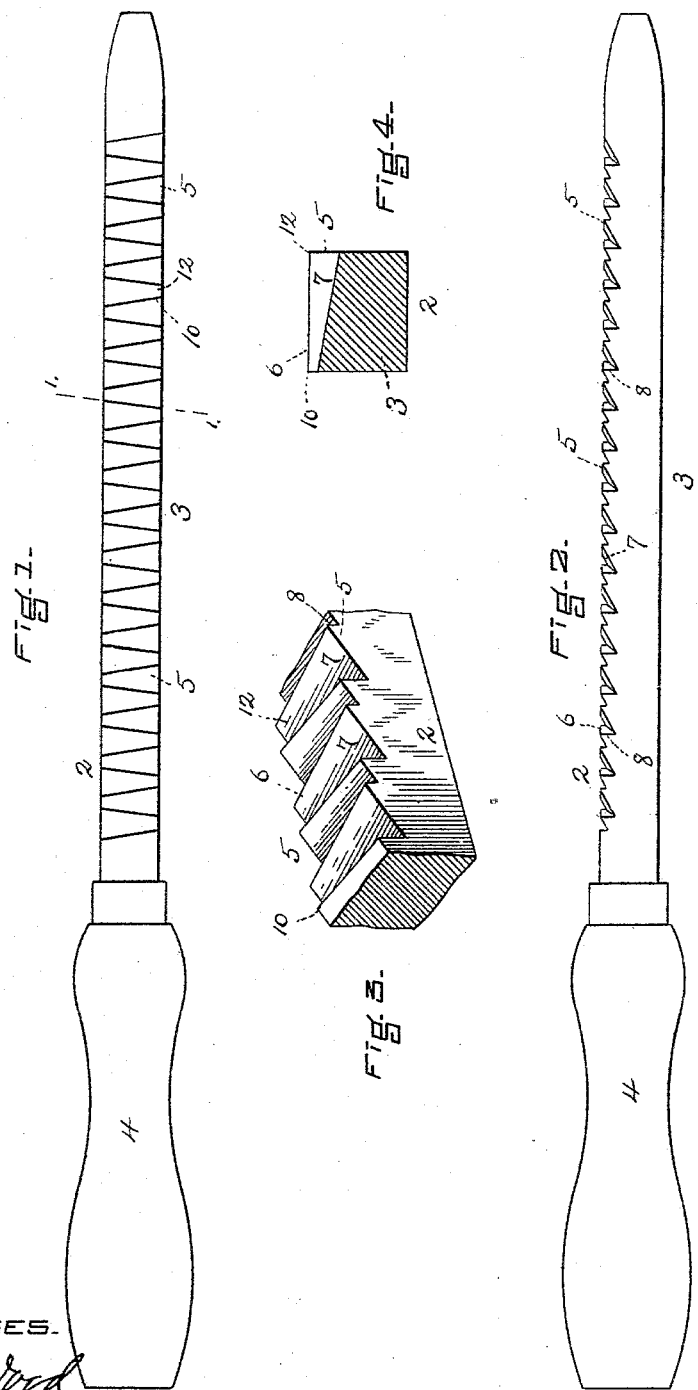
WITNESSES.
Geo. F. Wood
E. K. Boynton
INVENTOR.
Henry Zollinger,
by H. E. Lodge Atty.

UNITED STATES PATENT OFFICE.

HENRY ZOLLINGER, OF HYDE PARK, MASSACHUSETTS.

RASP.

SPECIFICATION forming part of Letters Patent No. 562,691, dated June 23, 1896.

Application filed December 27, 1895. Serial No. 573,483. (No model.)

*To all whom it may concern:*

Be it known that I, HENRY ZOLLINGER, a citizen of the United States, residing at Hyde Park, in the county of Norfolk and State of Massachusetts, have invented certain new and useful Improvements in Rasps; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in rasps adapted for operation either upon wood or metal.

My invention is embodied in the shape and arrangement of the cutting devices or teeth, whereby a shearing stroke is produced as the tool is pushed or advanced over the substance to be operated upon.

Briefly described, my invention consists in the shape of the teeth, comprising a plurality of members, the cutting edges of which are all located in the same plane. Furthermore, the teeth are alternately and obliquely disposed across the longitudinal axis of the rasp, and each tooth consists of a cutting face and a clearing-surface. Owing to the peculiar shape and position of the teeth, the depth of the tooth increases from one side of the rasp to the opposite side, while the clearing-surface of said tooth narrows or decreases in the same direction.

Other peculiarities will hereinafter be more fully explained and described.

The drawings herewith accompanying this specification represent, in—

Figure 1, a plan of the active surface of a rasp embodying my invention. Fig. 2 is a side elevation. Fig. 3 is an enlarged perspective view of several consecutive teeth. Fig. 4 is a cross-section on the line 1 1 in Fig. 1.

In the said drawings, 2 represents a rasp composed of a metal portion 3 and a handle 4. This metallic portion may be of any suitable length and may vary in cross-section, which is preferably rectangular.

In carrying out my invention, and assuming that the rasp is of the cross-section, as shown, a plurality of teeth 5 are created in one side of the portion 3. Said teeth comprise a cutting edge 6 and a clearing-surface 7. In the formation of each tooth the cutting edge 6 is produced by an upright shoulder or upraise 8, positioned obliquely across and normal to the surface of the rasp, said cutting edges being alternately arranged, as shown. The height of this shoulder gradually increases from one side to the opposite corresponding side of the rasp, while the clearing-surface diminishes as it extends in the same direction. Thus the heel of one tooth and the point of the next adjacent tooth are in propinquity, while the clearing-surface is a plane surface and obliquely inclined with respect to the general side surface of the rasp at the point where it is created.

In the operation of this instrument for active work the rasp is pushed from the user, in this way bringing the upright shoulder against the surface to be acted upon. The obliquity of the cutting edges to the straight thrust of the rasp produces a shearing movement of said edges upon the surface of the wood, metal, or other material, and the shaving passes therefrom and contacts against the surface 7; but, since the shaving is first formed at the point 10 of the tooth, it moves out upon the narrowest part 12 of the clearing-surface, which expands in area as it extends toward the heel of the tooth. Hence an easy path is created for the escape of the shavings, and a rapid clearance is effected without danger of clogging.

It will be seen that in the operation of the tool the cutting edge of each tooth coöperates with the clearing-surface of the next adjacent tooth in front.

To prevent the extremities of the cutting edge from gouging into the material, the center of said edge may be slightly higher, or, in other words, the teeth may be crowned; but as illustrated they are straight. This rasp has several advantages over a single-knife tool, since, from the fact that the various teeth all lie in the same plane, it is evident the teeth are prevented from entering to an undue extent, especially in cutting against or across the grain of wood.

In sharpening this rasp a file is passed over the clearing-surface and against the upright shoulder until these surfaces intersect in a sharp edge, after which the rasp is laid upon the level surface of an oilstone or emery-stone and all the cutting edges are reduced to the same plane.

What I claim is—

1. A rasp comprising a plurality of teeth extending across one side of the tool and disposed obliquely and alternately in series, each tooth comprising an upright surface which commences on one side and increases in depth to the opposite corresponding side of said tool, and an oblique surface which is angularly disposed with respect to the upright surface and diminishes in area as it extends in the same direction, substantially as explained.

2. In a rasp a series of teeth alternately and oppositely arranged obliquely across one side of the rasp, and composed of a plurality of shoulders which increase in depth from the point to the heel of a tooth and normal to the surface of the rasp, and a plurality of plane surfaces which intersect the shoulders and diminish in superficial area from the point to the heel of a tooth, the intersecting lines of the shoulders and the plane surfaces being coincident with the surface of the rasp, substantially as stated.

3. A tooth for a rasp formed in metal by the meeting of two plane surfaces obliquely inclined to each other, the cutting-surfaces increasing in area from the point of the tooth to the heel of said tooth, and the clearing-surface diminishing in area in a corresponding direction, the clearing-surface of one tooth coöperating with the cutting-surface of the next tooth behind, substantially as stated.

In testimony whereof I affix my signature in presence of two witnesses.

HENRY ZOLLINGER.

Witnesses:
FREDK. SKINNER,
H. E. LODGE.